United States Patent
Yoshizawa (10) Patent No.: US 10,666,103 B2
(45) Date of Patent: May 26, 2020

(54) ROTOR OF ROTATING ELECTRIC MACHINE

(71) Applicant: HONDA MOTOR CO., LTD., Tokyo (JP)

(72) Inventor: Takuya Yoshizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/214,370

(22) Filed: Dec. 10, 2018

(65) Prior Publication Data

US 2019/0207451 A1 Jul. 4, 2019

(30) Foreign Application Priority Data

Dec. 28, 2017 (JP) .................................. 2017-254260

(51) Int. Cl.
| | |
|---|---|
| *H02K 9/00* | (2006.01) |
| *H02K 1/32* | (2006.01) |
| *H02K 9/19* | (2006.01) |
| *H02K 1/30* | (2006.01) |
| *H02K 1/27* | (2006.01) |

(52) U.S. Cl.
CPC .............. *H02K 1/32* (2013.01); *H02K 1/276* (2013.01); *H02K 1/2766* (2013.01); *H02K 1/30* (2013.01); *H02K 9/19* (2013.01)

(58) Field of Classification Search
CPC .. H02K 1/32; H02K 1/30; H02K 9/00; H02K 9/04; H02K 9/12; H02K 1/276; H02K 9/08; H02K 9/16; H02K 9/193; H02K 9/24
See application file for complete search history.

(56) References Cited

U.S. PATENT DOCUMENTS

| | | | | |
|---|---|---|---|---|
| 5,889,342 | A * | 3/1999 | Hasebe ..................... | H02K 1/32 |
| | | | | 310/156.19 |
| 2009/0261667 | A1* | 10/2009 | Matsubara ........... | H02K 1/2766 |
| | | | | 310/54 |
| 2013/0221772 | A1* | 8/2013 | Miyamoto ............... | H02K 9/19 |
| | | | | 310/54 |

(Continued)

FOREIGN PATENT DOCUMENTS

| | | |
|---|---|---|
| JP | 2009-195089 A | 8/2009 |
| JP | 2011-172375 A | 9/2011 |

(Continued)

OTHER PUBLICATIONS

Aug. 13, 2019, Japanese Office Action issued for related JP Application No. 2017-254260.

*Primary Examiner* — Thanh Lam
(74) *Attorney, Agent, or Firm* — Paratus Law Group, PLLC (57) ABSTRACT

A rotor of a rotating electric machine includes a rotor yoke and a pair of end plates disposed on both axial sides of the rotor yoke. The rotor yoke is provided with a yoke cavity portion axially passing through a yoke main body, end plate hole portions communicating with the yoke cavity portion are provided in the pair of end plates, the yoke cavity portion and the end plate hole portions have a substantially triangular shape protruding toward an outer-diameter-side, and in the yoke cavity portion, top portions on both circumferential sides and a top portion on an outer-diameter-side are exposed from the end plate hole portions.

5 Claims, 4 Drawing Sheets

(56) References Cited

U.S. PATENT DOCUMENTS

| | | | | |
|---|---|---|---|---|
| 2015/0137632 A1* | 5/2015 | Takahashi | ............... | H02K 1/28 |
| | | | | 310/54 |
| 2015/0303774 A1* | 10/2015 | Kitta | ....................... | H02K 9/10 |
| | | | | 310/54 |
| 2019/0068012 A1* | 2/2019 | Yazaki | ................ | H02K 1/2766 |
| 2019/0379250 A1* | 12/2019 | Wakui | ................... | H02K 1/276 |

FOREIGN PATENT DOCUMENTS

| | | |
|---|---|---|
| JP | 2011-223717 A | 11/2011 |
| JP | 2013-183481 A | 9/2013 |
| JP | 2017-184343 A | 5/2017 |

* cited by examiner

ROTOR OF ROTATING ELECTRIC MACHINE

CROSS-REFERENCE TO RELATED APPLICATIONS

The present application claims the benefit of priority of Japanese Patent Application No. 2017-254260, filed on Dec. 28, 2017, the content of which is incorporated herein by reference.

TECHNICAL FIELD

The present invention relates to a rotor of a rotating electric machine mounted on an electric vehicle or the like.

BACKGROUND ART

A rotor of a rotating electric machine includes a rotor yoke, a pair of end plates disposed on both axial sides of the rotor yoke, and a resolver for detecting a rotation angle of the rotor. The rotor yoke is formed by laminating a plurality of core members formed of electromagnetic steel plates in a substantially annular shape and a plurality of magnets forming magnetic pole portions are embedded on an outer circumferential side of the core members. When the rotor of the rotating electric machine is assembled as described above, a positioning pin is inserted through a yoke cavity portion formed in the rotor yoke and an end plate hole portion formed in the end plate, so as to be assembled in a state where positioning is performed so that the phases of the magnetic poles of the magnets and a sensor of the resolver are in predetermined phases.

Further, even after the rotor of the rotating electric machine is assembled, the quality inspection is carried out as to whether the rotor yoke is assembled with the correct phases based on a measuring point set in the yoke cavity portion. In an end plate of a rotor of the related art, a hole for positioning at the time of assembling a rotor yoke and post-assembly inspection and a hole for discharging a coolant are provided for each application.

In JP-A-2011-223717, a manufacturing method of a rotor of an electric motor in which a cooling flow path extending in an axial direction is provided inside a rotor yoke and the rotor is cooled by a coolant flowing through the cooling flow path, and then the coolant is discharged from a hole provided in an end plate, is disclosed.

Generally, according to a rotor of a rotating electric machine of the related art, a hole for positioning at the time of assembly and post-assembly inspection and a hole for discharging a coolant are separately provided in an end plate. Thus, the number of holes to be processed is increased and processing steps are extended, and further accuracy of each hole is required, whereby the cost is increased.

In the manufacturing method of a rotor of an electric motor disclosed in JP-A-2011-223717, there is a description about a cooling flow path of a rotor yoke, but positioning at the time of assembly and post-assembly inspection are not mentioned. Therefore, as similar to a general rotor of the related art, it is considered that a hole for positioning at the time of assembly and post-assembly inspection is provided separately from a hole for discharging a coolant.

SUMMARY

The invention provides a rotor of a rotating electric machine capable of performing positioning at the time of assembling a rotor yoke, post-assembly inspection, and discharge of a coolant by an end plate hole portion provided on an end plate.

According to an aspect of the invention, there is provided a rotor of a rotating electric machine including: a rotor yoke; and a pair of end plates disposed on both axial sides of the rotor yoke, wherein: the rotor yoke is provided with a yoke cavity portion axially passing through a yoke main body; end plate hole portions, communicating with the yoke cavity portion, are provided in the pair of end plates; the yoke cavity portion and the end plate hole portions have a substantially triangular shape protruding toward an outer-diameter-side: and in the yoke cavity portion, top portions on both circumferential sides and a top portion on an outer-diameter-side are exposed from the end plate hole portions.

EFFECTS

According to the invention, since both circumferential side top portions of the yoke cavity portion formed in the yoke main body of the rotor yoke is exposed from the end plate hole portion, positioning at the time of assembling the rotor yoke and post-assembly quality inspection can be easily performed. Further, since the outer-diameter-side top portion of the yoke cavity portion is exposed from the end plate hole portion, the coolant is prevented from being accumulated inside the yoke cavity portion. Therefore, it is possible to prevent the vibration occurred due to the imbalance of the coolant at the time of starting which is caused by the coolant accumulated in the yoke cavity portion when the rotor is stopped. In this way, both circumferential side top portions and the outer-diameter-side top portion of the yoke cavity portion having a substantially triangular shape protruding toward the outer-diameter-side are exposed from the end plate hole portion having a substantially triangular shape which also protrudes toward the outside diameter side, in such a manner that the positioning when assembling the rotor yoke, the post-assembly inspection and the discharge of the coolant can be performed by sharing the end plate hole portions of one type which are provided on the end plates.

DETAILED DESCRIPTION OF EMBODIMENT

Hereinafter, an embodiment of a rotor of a rotating electric machine of the present invention will be described with reference to FIGS. 1 to 4.

Figure 1:
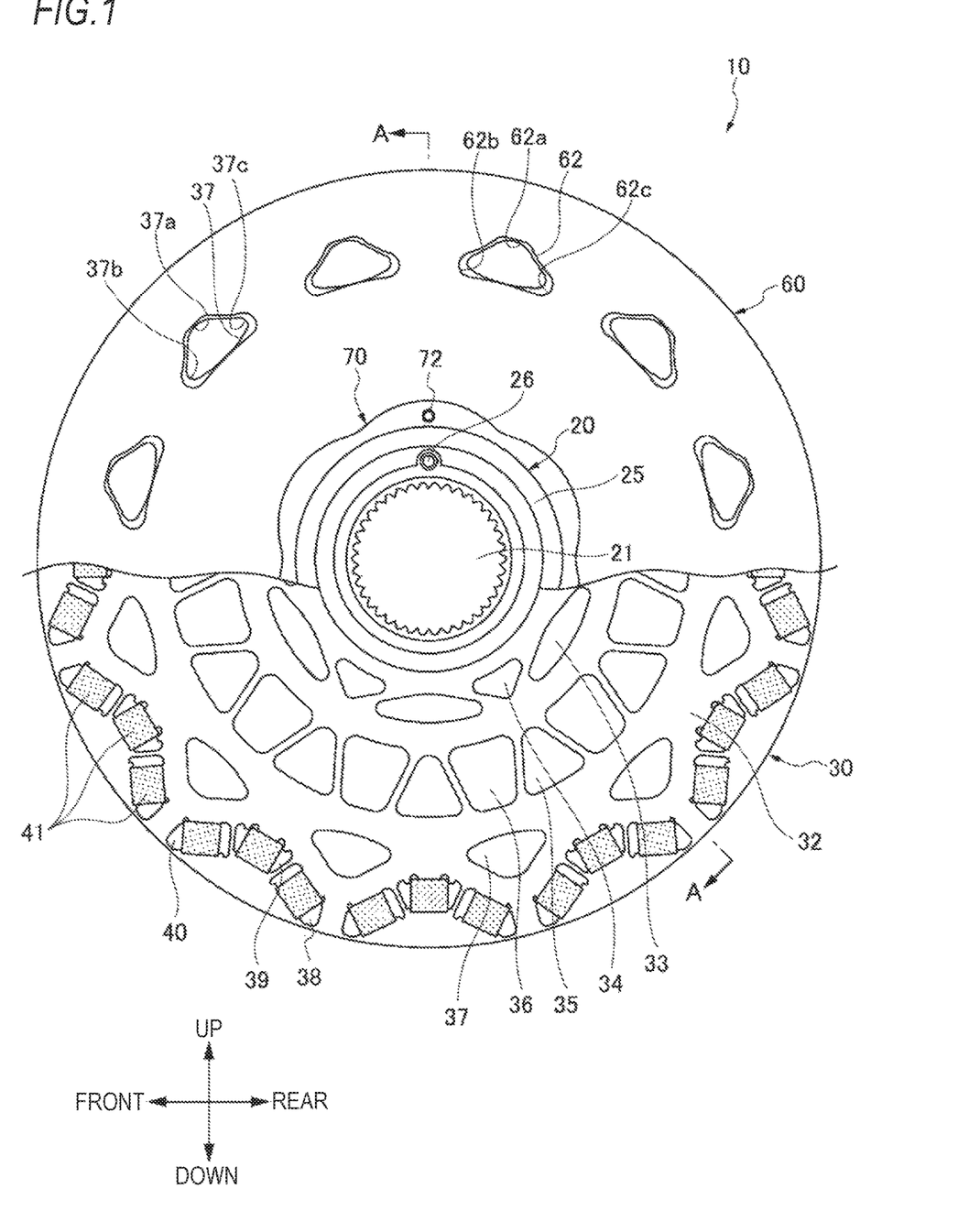
FIG. 1 is a front view of a rotor of a rotating electric machine according to an embodiment of the present invention where a part of an end plate is cut away.
Figure 2:
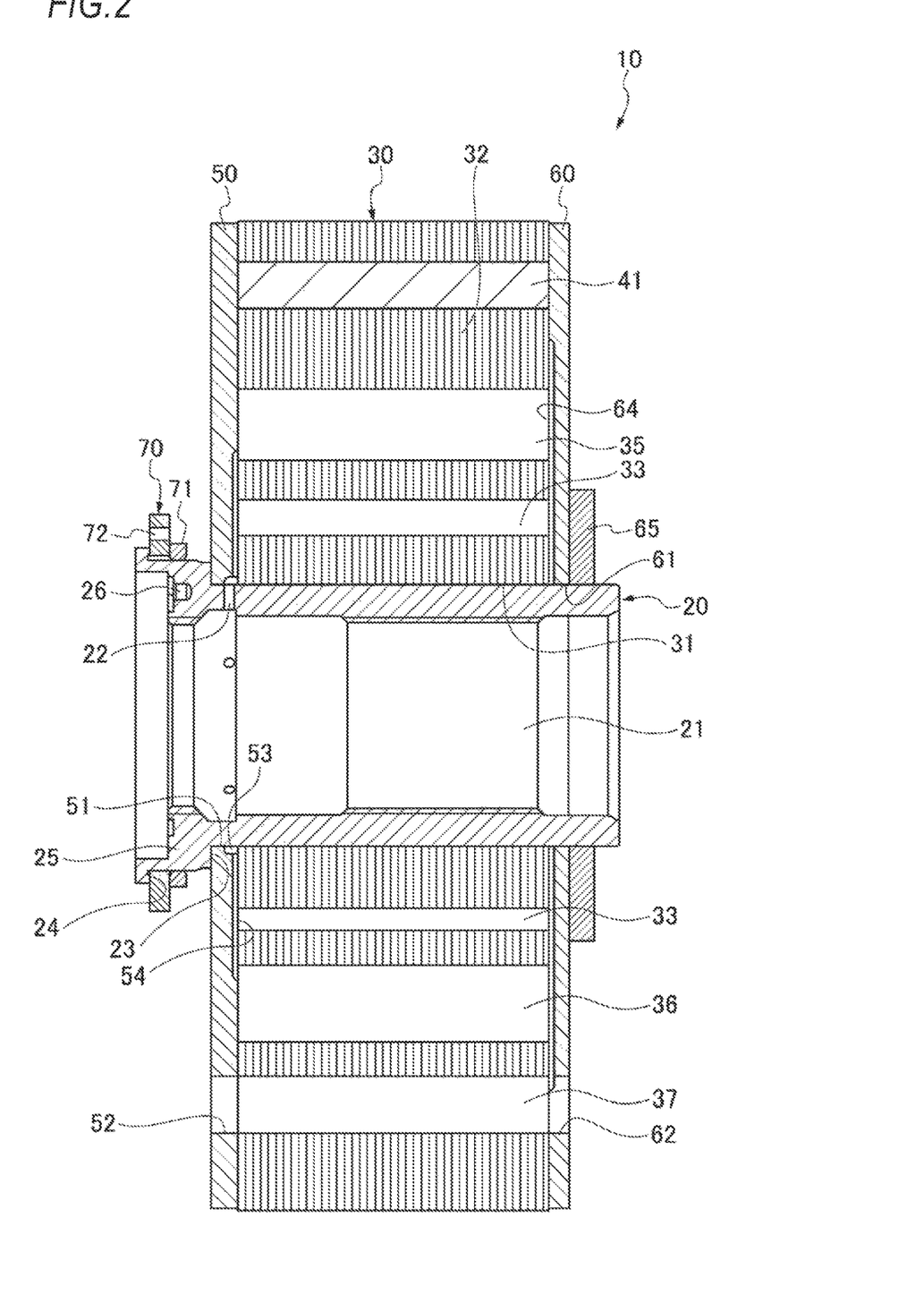
FIG. 2 is a cross-sectional view taken along the line A-A of FIG. 1.

As illustrated in FIGS. 1 and 2, a rotor 10 of the rotating electric machine of the embodiment includes a rotor shaft 20, a rotor yoke 30 journaled on the rotor shaft 20, a first end plate 50 disposed on one side in an axial direction of the rotor yoke 30, a second end plate 60 disposed on the other side in the axial direction of the rotor yoke 30, and a resolver 70 for detecting a rotation angle of the rotor 10.

A cooling flow path 21 where a coolant flows is formed inside the rotor shaft 20. The cooling flow path 21 extends in the axial direction within the rotor shaft 20 and is configured so that the coolant can be supplied from the outside. As the coolant, for example, Automatic Transmission Fluid (ATF) is used and a supply path is formed so that the ATF circulates between a transmission case and a motor housing.

A coolant supply hole portion 22 for feeding the coolant from the cooling flow path 21 to the rotor yoke 30 is formed on an inner circumferential surface of the rotor shaft 20. Further, a large diameter portion 25 having first and second step portions 23 and 24 is formed at one end (left end portion in FIG. 2) of the rotor shaft 20. On an end surface of the large diameter portion 25, a shaft reference hole 26 for phase-matching with the rotor yoke 30 and the resolver 70 is provided.

The rotor yoke 30 is formed by laminating electromagnetic steel plates of substantially the same shape along a direction perpendicular to the surface of the paper in FIG. 1 and bonding them together by caulking, bonding, or welding. In the rotor yoke 30, a rotor insertion hole 31 is penetrated in the axial direction at a center of the rotor yoke 30 and constituted to have a cylindrical shape. The rotor shaft 20 is press-fitted and fixed to the rotor insertion hole 31.

As illustrated in FIG. 1, a plurality of cavity portions 33 to 40 are formed in a yoke main body 32 of the rotor yoke 30 to reduce the weight. First, a cavity portion 33 having a substantially oval cross section and a cavity portion 34 having a substantially triangular cross section are formed in the vicinity of an inner periphery of the rotor yoke 30, alternately along a circumferential direction. Further, a cavity portion 35 having a substantially triangular cross section and a cavity portion 36 having a substantially trapezoidal cross section are formed in a portion further on the outer peripheral side than the cavity portions 33 and 34, alternately along the circumferential direction.

Further, a plurality (12 in the illustrated embodiment) of cavity portions 37 (hereinafter, this cavity portion is referred to as a yoke cavity portion 37) having a substantially triangular cross section are formed in a portion further on the outer peripheral side than the cavity portions 35 and 36, at equal intervals in the circumferential direction to penetrate in the axial direction. The yoke cavity portion 37 is formed in a substantially triangular shape of which the cross-sectional shape is convex toward an outer-diameter-side.

Figure 4:
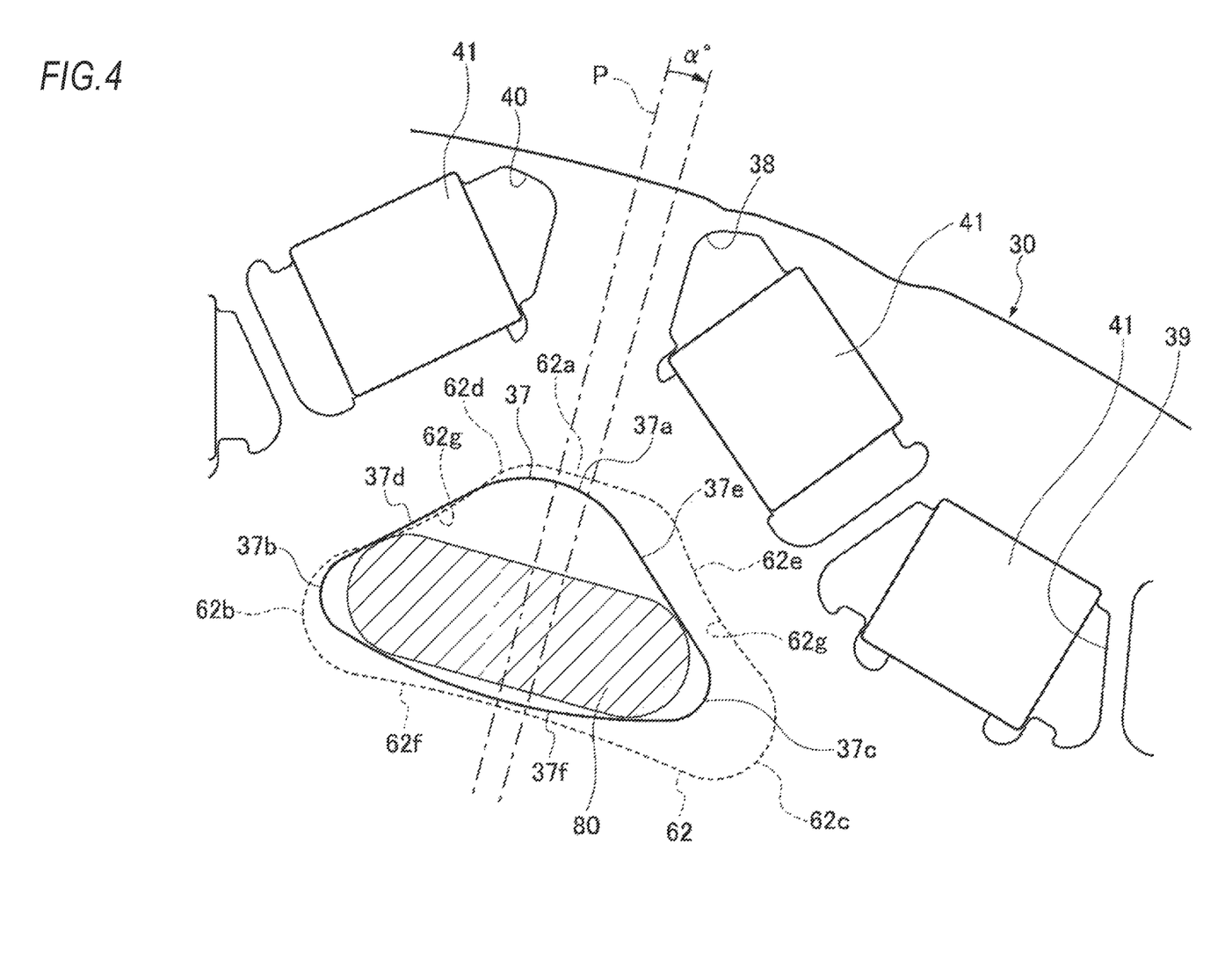
FIG. 4 is a front enlarged view of a rotor yoke illustrating the shape and positional relationship between a yoke cavity portion and an end plate hole portion.

As illustrated in FIG. 4, the yoke cavity portion 37 has a substantially triangular shape in which an outer-diameter-side top portion 37a positioned on the outer-diameter-side and circumferential side top portions 37b and 37c positioned on both sides in the circumference direction are connected. When the rotor 10 is assembled, the top portions 37a, 37b, and 37c of the yoke cavity portion 37 communicate with end plate hole portions 52 and 62 of first and second end plates 50 and 60 described below and are exposed from the end plate hole portions 52 and 62 in a front view.

In the yoke main body 32, the cavity portions 38, 39, and 40 for embedding magnets 41 are formed on the outer circumferential sides from the yoke cavity portion 37 at predetermined intervals along the circumferential direction. The magnet 41 is a permanent magnet such as a neodymium magnet and three magnets arranged in the cavity portions 38, 39, and 40 constitute one magnetic pole portion. In the embodiment illustrated in FIG. 1, twelve magnetic pole portions are formed in the rotor 10.

A shaft insertion hole 51 is formed in a center of the first end plate 50 and the rotor shaft 20 is loosely fitted into the shaft insertion hole 51. The first end plate 50 is pinched between an end surface on one side in the axial direction of the rotor yoke 30 and the first step portion 23, in such a manner that the axial position thereof is positioned.

In a portion further on the outer side than the shaft insertion hole 51 in the radial direction, the end plate hole portions 52 are formed at equal intervals in the circumferential direction. The same number of end plate hole portions 52 are formed as the yoke cavity portions 37 at the same radial positions and at the same circumferential intervals.

The end plate hole portion 52 is larger than the yoke cavity portion 37 and is formed in a substantially triangular shape which is convex toward the outer-diameter-side as similar to the yoke cavity portion 37. Therefore, the yoke cavity portion 37 of the rotor yoke 30 and the end plate hole portion 52 of the first end plate 50 are assembled in a phase-matched state, so that the end plate hole portion 52 and the yoke cavity portion 37 communicate with each other.

Figure 3:
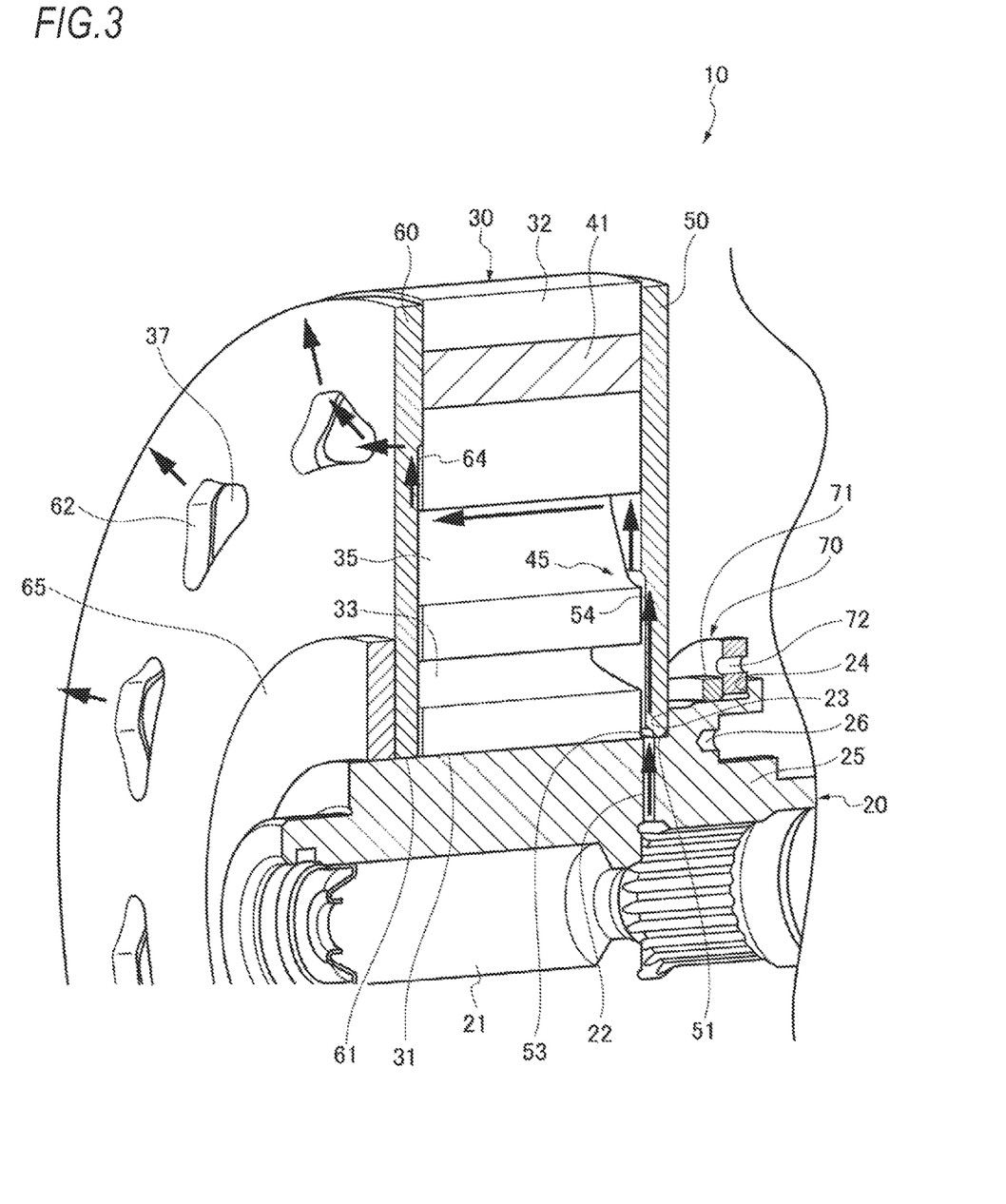
FIG. 3 is a perspective view of a cross section of the rotor of the rotating electric machine of FIG. 1 as seen from an oblique direction.

As illustrated in FIG. 3, a plurality of radial grooves 53 are formed at equal intervals in the circumferential direction at the inner corner portion (corner portion on the rotor yoke 30 side) of the shaft insertion hole 51 of the first end plate 50. An annular groove 54 is formed on the inner surface of the first end plate 50 on the rotor yoke 30 side. The annular groove 54 communicates the plurality of radial grooves 53 with the cavity portions 33, 34, 35, and 36.

A shaft insertion hole 61 is formed in a center of the second end plate 60 and the rotor shaft 20 is loosely fitted into the shaft insertion hole 61. The second end plate 60 abuts on the end surface of the rotor yoke 30 on the other axial side and the axial position thereof is positioned by an end plate collar 65 press-fitted into the rotor shaft 20.

In a portion further on the outer side than the shaft insertion hole 61 in a radial direction, the end plate hole portions 62 are formed at equal intervals in the circumferential direction. The same number of end plate hole portions 62 are formed as the yoke cavity portions 37 at the same radial positions and at the same circumferential intervals. The end plate hole portion 62 is larger than the yoke cavity portion 37 and is formed in a substantially triangular shape which is convex toward the outer-diameter-side as similar to the yoke cavity portion 37.

Therefore, the yoke cavity portion 37 of the rotor yoke 30 and the end plate hole portion 62 of the second end plate 60 are assembled in a phase-matched state, so that the end plate hole portion 62 and the yoke cavity portion 37 communicate with each other.

An annular groove 64 is formed on the inner surface of the second end plate 60 on the rotor yoke 30 side. The annular groove 64 communicates the cavity portion 35, the yoke cavity portion 37, and the end plate hole portion 62.

The end plate hole portion 52 of the first end plate 50 and the end plate hole portion 62 of the second end plate 60 have the same shape. The detailed shapes and positional relationships between the yoke cavity portion 37 and the end plate hole portions 52 and 62 will be described in detail below. In the first end plate 50 and the second end plate 60, the end plate hole portions 52 and 62 are holes on the outermost diameter side. It is preferable that holes are not provided in the first end plate 50 and the second end plate 60 except for the shaft insertion holes 51 and 61 and the end plate hole portions 52 and 62.

The resolver 70 is for detecting the rotation angle of the rotor 10. The resolver 70 is press-fitted into the large diameter portion 25 and fixed to the rotor shaft 20 by being pinched between a resolver collar 71 which is press-fitted into the large diameter portion as similar to the resolver 70 and the second step portion 24.

In order to accurately detect the rotation angle of the rotor 10, it is required that the phases of the sensor of the resolver 70 and the magnetic pole of the magnet 41 are matched. Therefore, the resolver 70 is provided with a resolver reference hole 72 for positioning. The resolver 70 is assembled to the rotor shaft 20 where the resolver reference hole 72 is phase-matched with the shaft reference hole 26 of the rotor shaft 20.

As illustrated in FIGS. 2 to 4, assembling of the rotor 10 is performed by fitting the rotor shaft 20 in which the resolver 70 is press-fitted into the large diameter portion 25 into the shaft insertion hole 51 of the first end plate 50 and bringing the first end plate 50 into contact with the first step portion 23. In this case, a positioning pin 80 (see FIG. 4) of an assembling jig is inserted through the end plate hole portion 52 of the first end plate 50.

Further, while the positioning pin 80 is inserted into the yoke cavity portion 37 of the rotor yoke 30, the rotor shaft 20 is press-fitted into the rotor insertion hole 31, in such a manner that the rotor yoke 30 and the rotor shaft 20 are integrally assembled.

The positioning pin 80 is a jig for assembling the rotor yoke 30 where the phase of the rotor yoke 30 is matched with respect to the rotor shaft 20 and has a substantially oval cross section. In the positioning pin 80, both circumferential ends thereof are simultaneously brought into contact with two sides 37d and 37e and a bottom side 37f of the yoke cavity portion 37 in the circumferential direction, in such a manner that the circumferential phase of the rotor yoke 30 is positioned.

The positioning pin 80 is provided in a predetermined phase with respect to the shaft reference hole 26 of the rotor shaft 20 so that the circumferential phase between the rotor shaft 20 and the rotor yoke 30 becomes a predetermined phase.

By matching the phase of the yoke cavity portion 37 with respect to the shaft reference hole 26 of the rotor shaft 20, the phase of the magnetic pole of the magnet 41 is set to a predetermined phase. The cavity portions 38, 39, and 40 where the magnets 41 are embedded and the yoke cavity portion 37 are formed at the same time with the same pressing mold, whereby the yoke cavity portion 37 can be used as the phase of the magnetic pole.

Next, the rotor shaft 20 is loosely fitted to the shaft insertion hole 61 of the second end plate 60 while the positioning pin 80 is inserted into the end plate hole portion 62 of the second end plate 60 and the end plate collar 65 is press-fitted to the rotor shaft 20 while the second end plate 60 is pressed to the rotor yoke 30. As a result, the first and second end plates 50 and 60 and the rotor yoke 30 are integrally assembled to the rotor shaft 20 in a phase-matched state.

As described above, the first and second end plates 50 and 60 and the rotor yoke 30 are assembled, whereby a coolant flow path 45 is formed inside the rotor 10 by the cooling flow path 21, the coolant supply hole portion 22, the radial groove 53, the annular groove 54, the cavity portion 35, the annular groove 64, and the end plate hole portion 62, as illustrated in FIG. 3.

The coolant pressure-fed from a coolant pump (not illustrated) and supplied to the cooling flow path 21 flows through the coolant flow path 45 as indicated by the arrow in the drawing to cool the rotor 10 from the inside, and then the coolant is discharged radially outward from the end plate hole portion 62 by a centrifugal force to cool the stator coil (not illustrated) from the inside.

Hereinafter, detailed shapes and positional relationships between the yoke cavity portion 37 and the end plate hole portions 52 and 62 will be described with reference to FIG. 4.

The cross-sectional shape of the yoke cavity portion 37 is formed in a substantially triangular shape having the outer-diameter-side top portion 37a located on the outer-diameter-side and the circumferential side top portions 37b and 37c located on both circumferential sides. Two sides 37d and 37e which respectively connect the outer-diameter-side top portion 37a and the circumferential side top portion 37b and the outer-diameter-side top portion 37a and the circumferential side top portion 37c are formed in a straight line and the bottom side 37f which is a side connecting the circumferential side top portion 37b and the circumferential side top portion 37c is formed in an arc shape which is convex toward the inner diameter side.

The end plate hole portion 62 is larger than the yoke cavity portion 37 and formed in a substantially triangular shape which has the top portion 62a which has a substantially linear shape and is located further on the outer-diameter-side than the outer-diameter-side top portion 37a of the yoke cavity portion 37 and the circumferential side top portions 62b and 62c located further on the outer side than the circumferential side top portions 37b and 37c of the yoke cavity portion 37 in the circumferential direction. A bottom side 62f corresponding to the bottom side 37f of the yoke cavity portion 37 is formed further on the inner diameter side than the bottom side 37f of the yoke cavity portion 37 and is formed in an arc convex shape on the outer-diameter-side.

As described above, the yoke cavity portion 37 and the end plate hole portions 52 and 62 have a substantially triangular shape which is convex toward the outer-diameter-side and the end plate hole portion 62 is formed larger than the yoke cavity portion 37, so that the positioning pin 80 inserted into the yoke cavity portion 37 can be inserted into the end plate hole portions 52 and 62 in addition to the yoke cavity portion 37. The rotor shaft 20 is press-fitted to the rotor insertion hole 31 while the positioning pin is inserted into the yoke cavity portion 37 of the rotor yoke 30, in such a manner that it is possible to accurately position the rotor yoke 30 with respect to the rotor shaft 20.

Also, when the rotor 10 is assembled, if the positioning pin 80 is inserted into the end plate hole portions 52 and 62, the phases of the first and second end plates 50 and 60 and the rotor yoke 30 can be roughly matched. "The phases of the first end plate 50 and the second end plate 60 can be roughly matched" means that a state where the first end plate 50 and the second end plate 60 deviate from a circumferential center P of the yoke cavity portion 37 by a maximum allowable angle α° in a clockwise direction and a counter-clockwise direction is permitted. The maximum allowable angle α° depends on a gap between the yoke cavity portion 37 and the end plate hole portion 62.

Here, even when the first end plate 50 and the second end plate 60 are arranged in a state where the first end plate 50 and the second end plate 60 are deviated by the maximum allowable angle α° with respect to the circumferential center P of the yoke cavity portion 37, the circumferential top portions 37b and 37c and the outer-diameter-side top portion 37a are exposed from the end plate hole portions 52 and 62, regardless of the phases of the rotor yoke 30 and the first and second end plates 50 and 60, and the yoke cavity portion 37.

After assembly of the rotor 10, a quality inspection is made as to whether the rotor shaft 20 (shaft reference hole 26) and the magnetic poles of the magnets 41 are assembled with the correct phase. In the quality inspection, the circumferential side top portion 37b or 37c of the yoke cavity portion 37 is used as a measurement point. Therefore, the end plate hole portions 52 and 62 of the first and second end plates 50 and 60 are configured to such that the circumferential side top portion 37b or 37c of the yoke cavity portion 37 are to be visible in front view.

Since the yoke cavity portion 37 of the embodiment is independent of the phase between the rotor yoke 30 and the first and second end plates 50 and 60, and the top portions 37b and 37c of both circumferential ends are exposed from the end plate hole portions 52 and 62, the quality after assembly can be easily inspected.

In the embodiment, to reliably expose the top portions 37b and 37c of both circumferential ends from the end plate hole portions 52 and 62, two sides 62d and 62e of the end plate hole portions 52 and 62, the two sides 62d and 62e corresponding to two sides 37d and 37e of the yoke cavity portion 37, are provided with convex portions 62g which protrude further on an inner side than the two sides 37d and 37e of the yoke cavity portion 37 when the positioning pin 80 abuts on the end plate hole portion 62 as illustrated in FIG. 4.

As illustrated in FIG. 4, even when the second end plate 60 is deviated clockwise by the maximum allowable angle α° with respect to the rotor yoke 30, the convex portion 62g of the end plate hole portion 62 is brought into contact with the positioning pin 80, in such a manner that the circumferential side top portion 37b of the yoke cavity portion 37 can be prevented from being hidden by the circumferential side top portion 62b of the second end plate 60. Further, FIG. 4 illustrates a state where the second end plate 60 is deviated clockwise by the maximum allowable angle α° with respect to the rotor yoke 30. However, likewise, when the second end plate 60 is deviated counterclockwise by the maximum allowable angle α°, the circumferential side top portion 37c of the yoke cavity portion 37 can be prevented from being hidden by the circumferential side top portion 62b of the second end plate 60. In addition, although FIG. 4 is illustrated with the second end plate 60 as an example, the same applies to the first end plate 50.

Further, the top portion 62a of the end plate hole portion 62 is independent of the phase between the rotor yoke 30 and the second end plate 60 and formed further on the outer-diameter-side than the outer-diameter-side top portion 37a of the yoke cavity portion 37, and thus the outer-diameter-side top portion of the yoke cavity portion 37 is exposed from the end plate hole portion 62. In particular, the top portion 62a of the end plate hole portion 62 is formed substantially linearly, whereby the outer-diameter-side top portion 37a of the yoke cavity portion 37 is always exposed from the end plate hole portion 62 even when the first end plate 50 and the second end plate 60 are deviated by the maximum allowable angle α° with respect to the circumferential center P of the yoke cavity portion 37.

The coolant supplied into the coolant flow path 45 is discharged from the outer-diameter-side top portion 62a of the end plate hole portion 62 by a centrifugal force. However, when the rotor 10 stops, the coolant flows downward in the coolant flow path 45 by gravity and flows into the yoke cavity portion 37 positioned below. In this case, when the outer-diameter-side top portion 37a of the yoke cavity portion 37 is blocked by the second end plate 60, the coolant may not be discharged completely and may remain in the yoke cavity portion 37. The coolant accumulated in the yoke cavity portion 37 becomes a cause of imbalance of the rotor 10 and there is a possibility that vibration may be generated due to the imbalance at the time of starting the rotor 10.

In order to solve the imbalance problem, the outer-diameter-side top portion 62a of the end plate hole portion 62 is arranged further on the outer-diameter-side than the outer-diameter-side top portion 37a of the yoke cavity portion 37, in such a manner that, when the rotor 10 is stopped, the coolant flowing in the coolant flow path 45 is discharged from the outer-diameter-side top portion 37a of the yoke cavity portion 37 without staying in the yoke cavity portion 37.

As described above, according to the rotor 10 of the rotating electric machine of the embodiment, positioning of the rotor yoke 30 at the time of assembly, post-assembly inspection, and discharge of the coolant can be performed with sharing the end plate hole portions 52 and 62 of one type which are provided on the end plates 50 and 60.

The embodiment described above can be appropriately modified, improved, and the like. For example, both the yoke cavity portion and the end plate hole portion have a substantially triangular shape which is convex toward the outer-diameter-side and the shape, size, and position of the yoke cavity portion and the end plate hole portion can be appropriately set as long as both circumferential end top portion and the outer-diameter-side top portion of the yoke cavity portion are exposed from the end plate hole portion.

In addition, at least the following matters are described in this description. Further, although the corresponding constituent element or the like in the embodiment described above is illustrated in parentheses, it is not limited thereto.

(1) A rotor (rotor 10) of a rotating electric machine includes a rotor yoke (rotor yoke 30) and a pair of end plates (end plates 50 and 60) disposed at least on both axial sides of the rotor yoke, in which the rotor yoke is provided with a yoke cavity portion (yoke cavity portion 37) axially passing through a yoke main body (yoke main body 32), end plate hole portions (end plate hole portions 52 and 62) communicating with the yoke cavity portion are provided in the pair of end plates, both the yoke cavity portion and the end plate hole portion have a substantially triangular shape protruding toward an outer-diameter-side, and in the yoke cavity portion, top portions (circumferential side top portions 37b and 37c) on both circumferential sides and a top portion (outer-diameter-side top portion 37a) on an outer-diameter-side are exposed from the end plate hole portion.

According to (1), since both circumferential side top portions of the yoke cavity portion formed in the yoke main body of the rotor yoke is exposed from the end plate hole portion, positioning at the time of assembly and post-assembly quality inspection can be easily performed. Further, since the outer-diameter-side top portion of the yoke cavity portion is also exposed from the end plate hole portion, the coolant is prevented from being accumulated inside the yoke cavity portion. Therefore, it is possible to prevent the occurrence of vibration due to the imbalance of the coolant at the time of starting which is caused by the coolant accumulated in the yoke cavity portion when the rotor is stopped. In this way, both circumferential side top portions and the outer-diameter-side top portion of the yoke cavity portion having a substantially triangular shape protruding toward the outer-diameter-side are exposed from the end plate hole portion having a substantially triangular shape which also protrudes toward the outside diameter side, in such a manner that the positioning at the time of assembling the rotor yoke, the post-assembly inspection, and the discharge of the coolant can be performed by sharing the end plate hole portions of one type which are provided on the end plates.

(2) The rotor of the rotating electric machine according to (1), in which in the rotor yoke, a coolant flow path (45) is provided further on an inner diameter side than the yoke cavity portion, and the coolant supplied to the coolant flow path is discharged from the end plate hole portion.

According to (2), since, in the rotor yoke, the coolant flow path is provided further on the inner diameter side than the yoke cavity portion, that is, the yoke cavity portion is located further on the outer-diameter-side than the coolant flow path, it is possible to suppress the accumulation of the coolant inside the coolant flow path when the rotor is stopped.

(3) The rotor of the rotating electric machine according to (1) or (2), in which the end plate hole portion has convex portions (convex portions 62g) which respectively protrude inward between a top portion (top portion 62a) on an outer-diameter-side and top portions (top portions 62b and 62c) on both circumferential sides.

According to (3), the end plate hole portion has convex portions which respectively protrude inward between the top portion on the outer-diameter-side and the top portions on both circumferential sides. Therefore, even when the end plate hole portion of the end plate is deviated circumferentially with respect to the yoke cavity portion, the convex portions of the end plate hole portion are brought into contact with the positioning pin, in such a manner that it is possible to prevent the top portions on both circumferential sides of the yoke cavity portion from being hidden by the top portions on both circumferential sides of the end plate.

(4) The rotor of the rotating electric machine according to any one of (1) to (3), in which the end plate hole portion is an outermost diameter side hole portion provided in the end plate.

According to (4), by setting the end plate hole portion as the hole on the outermost diameter side, it is possible to further reliably supply the coolant scattering from the end plate hole portion during the rotation or the rotor to a coil end.

(5) The rotor of the rotating electric machine according to any one of (1) to (4), in which in the pair of end plates, insertion holes (51 and 61) where a rotor shaft (rotor shaft 20) is inserted are provided and a hole portion is not provided except for the shaft insertion holes and the end plate hole portions.

According to (5), since a hole portion is not provided in the end plate except for the shaft insertion hole and the end plate hole portion, the end plate can be easily manufactured.

The invention claimed is:

1. A rotor of a rotating electric machine comprising:
a rotor yoke; and
a pair of end plates disposed on both axial sides of the rotor yoke, wherein:
the rotor yoke is provided with a yoke cavity portion axially passing through a yoke main body;
end plate hole portions, communicating with the yoke cavity portion, are provided in the pair of end plates;
the yoke cavity portion and the end plate hole portions have a substantially triangular shape protruding toward an outer-diameter-side; and
in the yoke cavity portion, top portions on both circumferential sides and a top portion on an outer-diameter-side are exposed from the end plate hole portions.

2. The rotor of the rotating electric machine according to claim 1, wherein:
in the rotor yoke, a coolant flow path is provided further on an inner diameter side than the yoke cavity portion; and
the coolant supplied to the coolant flow path is discharged from the end plate hole portions.

3. The rotor of the rotating electric machine according to claim 1, wherein each of the end plate hole portions includes convex portions which respectively protrude inward between a top portion on an outer-diameter-side and top portions on both circumferential sides.

4. The rotor of the rotating electric machine according to claim 1, wherein the end plate hole portions are outermost diameter side hole portions provided in the end plates.

5. The rotor of the rotating electric machine according to claim 1, wherein in the pair of end plates, shaft insertion holes where a rotor shaft is inserted are provided and a hole portion is not provided except for the shaft insertion holes and the end plate hole portions.

* * * * *